United States Patent
Axmann

(10) Patent No.: US 7,004,310 B2
(45) Date of Patent: Feb. 28, 2006

(54) BELT BAND CONVEYOR HAVING SEPARATE GUIDE SHOES

(75) Inventor: Norbert Axmann, Sinsheim (DE)

(73) Assignee: Interroll (Schweiz) AG, Sant' Antonino (CH)

( * ) Notice: Subject to any disclaimer, the term of this patent is extended or adjusted under 35 U.S.C. 154(b) by 0 days.

(21) Appl. No.: 10/966,002

(22) Filed: Oct. 15, 2004

(65) Prior Publication Data
US 2005/0082146 A1    Apr. 21, 2005

(30) Foreign Application Priority Data
Oct. 17, 2003  (DE) ................ 103 49 049

(51) Int. Cl.
*B65G 21/16* (2006.01)
(52) U.S. Cl. ................................. 198/831
(58) Field of Classification Search ........... 198/831, 198/840, 841, 842
See application file for complete search history.

(56) References Cited

U.S. PATENT DOCUMENTS

| | | | | |
|---|---|---|---|---|
| 3,901,379 A | * | 8/1975 | Bruhm | 198/831 |
| 4,955,466 A | * | 9/1990 | Almes et al. | 198/831 |
| 5,332,082 A | | 7/1994 | Sommerfield | |
| 5,332,083 A | | 7/1994 | Axmann | |
| 5,360,102 A | * | 11/1994 | Schoning | 198/831 |
| 5,394,977 A | * | 3/1995 | Cline | 198/831 |
| 5,839,570 A | * | 11/1998 | Vertogen et al. | 198/831 |
| 5,988,362 A | * | 11/1999 | Nakamura et al. | 198/831 |
| 6,564,931 B1 | * | 5/2003 | Edelmann | 198/831 |

FOREIGN PATENT DOCUMENTS

| | | |
|---|---|---|
| DE | 23 23 601 C2 | 11/1974 |
| DE | 38 26 953 | 3/1990 |
| DE | 4213 035 A1 | 10/1993 |
| DE | 198 05 204 A1 | 8/1999 |
| DE | 198 54 327 A1 | 6/2000 |
| DE | 199 53 691 A1 | 5/2001 |
| DE | 103 22 216 A1 | 10/2003 |
| EP | 0 880 462 | 12/1998 |
| NL | 8702617 | 6/1989 |

\* cited by examiner

*Primary Examiner*—James R. Bidwell
(74) *Attorney, Agent, or Firm*—Collard & Roe, P.C.

(57) ABSTRACT

The invention relates to a belt band conveyor such as a curved belt conveyor having an endless transport belt that is guided over deflection rollers. There is a guide element that projects beyond the belt plane wherein this guide element can be handled separately before it is attached to the transport belt. This guide element moves along as the transport belt moves, and on whose guide surfaces, which extend in the transport direction of the transport belt has running surfaces that are inclined relative to the belt plane roll off from rotating guide rollers as the transport belt moves. Thus, lateral forces that occur crosswise to the transport direction of the transport belt can be compensated. A plurality of separate guide shoes are attached to the transport belt, forming a guide strip for the guide rollers that extends in the transport direction, circulates, and is divided into multiple parts.

36 Claims, 6 Drawing Sheets

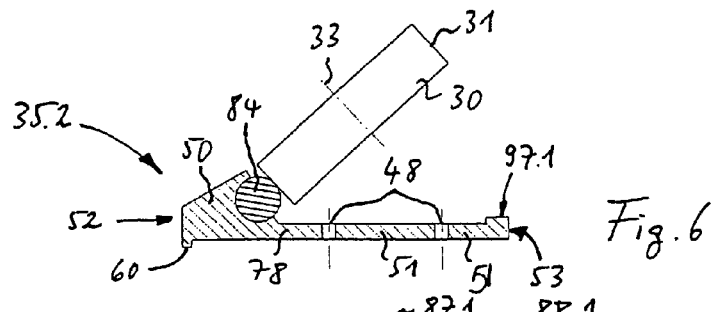
Fig. 6
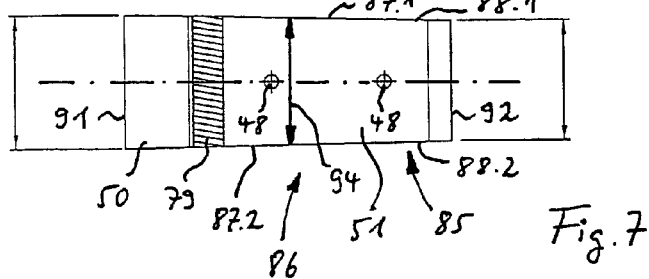
Fig. 7
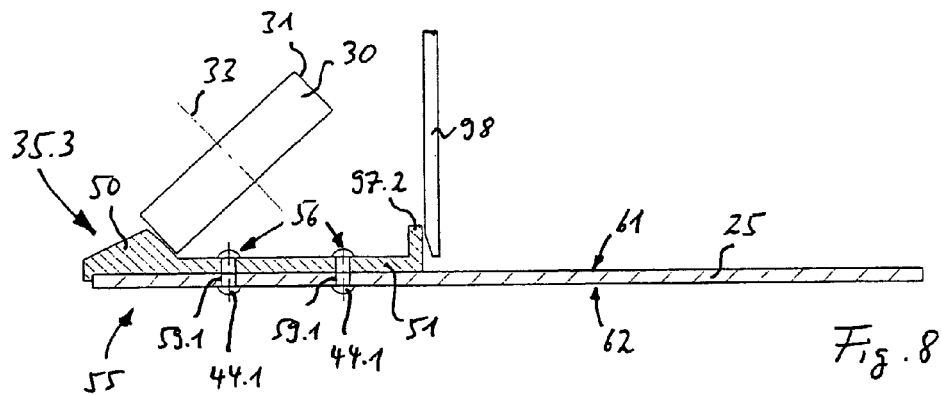
Fig. 8
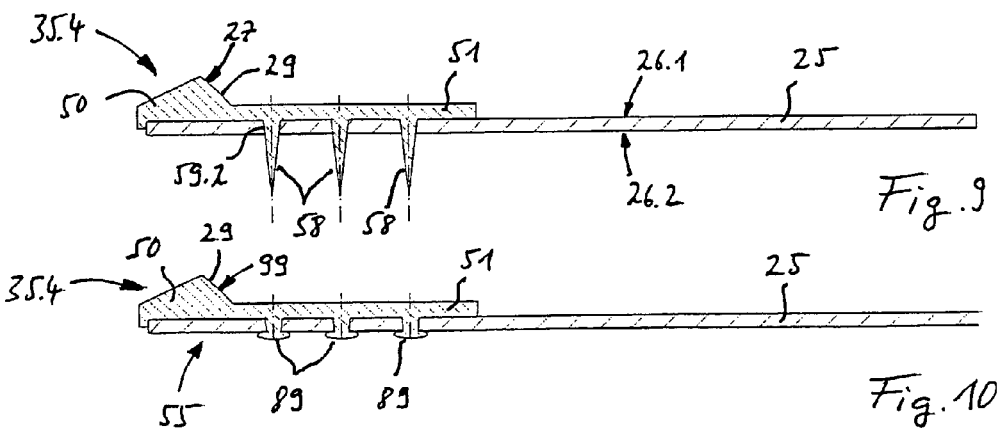
Fig. 9
Fig. 10

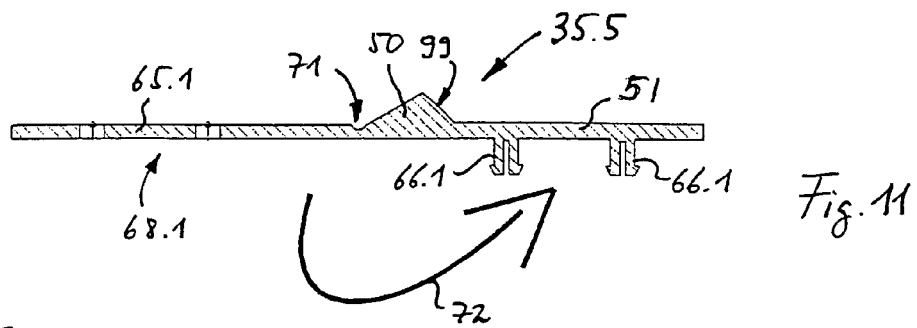
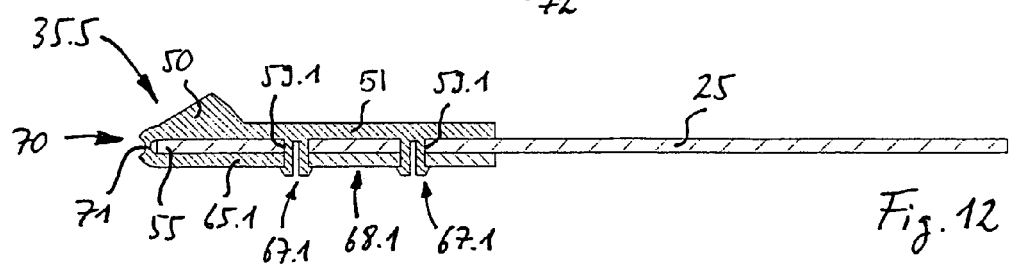
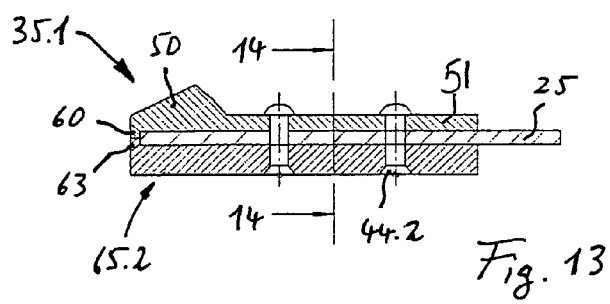
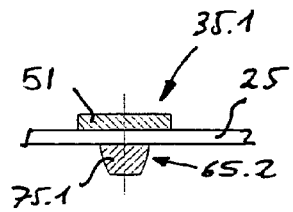
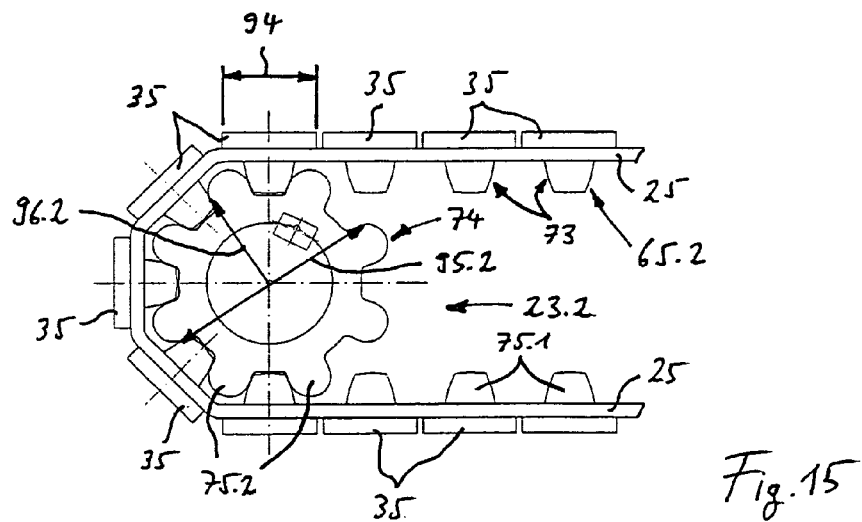

BELT BAND CONVEYOR HAVING SEPARATE GUIDE SHOES

CROSS REFERENCE TO RELATED APPLICATIONS

This Application claims priority under 35 U.S.C. 119 from German Application Serial No. 103 49 049.3-22 filed on Oct. 17, 2003.

BACKGROUND OF THE INVENTION

The invention relates to a belt band conveyor, particularly a curved belt conveyor, having an endless transport belt that is guided over deflection rollers. Attached to the transport belts, is a guide element that projects beyond the belt plane. This guide element can be handled separately before it is attached to the transport belt, and which moves along as the transport belt moves. The guide element has guide surfaces, which extend in the transport direction of the transport belt. There are also running surfaces that are inclined relative to the belt plane and which roll off from rotating guide rollers, to compensate for lateral forces that occur crosswise to the transport direction of the transport belt.

A curved belt conveyor has become known from German Patent DE 42 13 035 A1, which relates to a corresponding U.S. Pat. No. 5,332,083 the disclosure of which is hereby incorporated herein by reference. This reference which discloses a circulating endless transport belt which is connected with an edge bead that runs along its outside edge. This belt is continuous, is inseparably connected with it, and circulates along with it. Several guide rollers are elastically pressed against this flank, which points towards the center of the curve, to compensate for the longitudinal and traverse forces that occur as a result of the curve progression. This occurs even in the case of a severely distorted curve, and in the case of significant level differences between the deflection rollers at the end, with low friction wear.

German Patent DE 38 26 953 A1 discloses a similar curved belt conveyor having a transport belt that is deflected by way of cone-shaped support rollers, which has a continuous, co-circulating, bead-shaped edge strip. The edge strip, again, is guided between guide rollers that have inclined running surfaces, to compensate for the centripetal forces that occur during operation.

A similar belt band conveyor has become known from German reference DE 198 54 327 A1, which has a corresponding U.S. Pat. No. 6,564,931, the disclosure of which is hereby incorporated herein by reference. There, a toothed belt component of a toothed belt that is continuous and circulates with the transport belt is provided to transfer the force of the drive forces from a gear crown to the transport belt. The toothed belt component has a bead strip on its ends that point radially inward, in each instance, which is continuous over the length of the transport belt. Again, inclined running surfaces of guide rollers engage on the bead to be able to absorb the forces directed to he inside radius of belt curves and to achieve secure guidance of the transport belt.

German reference DE 199 53 691 A1 discloses a further development of the belt band conveyor described above, which relates to a belt tensioning device. There, a continuous toothed belt is attached to the bottom of the transport belt, moving with it, and a continuous profile that lies opposite is attached to the top of the belt. The profile has an elevation that faces away from the edge region of the transport belt, which again serves for contact of guide rollers. To secure the position of the transport belt when the belt starts up under stress, and to prevent the teeth of the gear wheel of the drive roller and the teeth of the toothed belt from getting out of engagement, there are several ball bearings, which contact the profile at the top of the transport belt.

Another system of a curved belt conveyor has become known from German reference DE 198 05 204 A1. There, a continuous holder strip, disposed radially on the outside, is attached on the inside of a circulating transport belt. Slide sleeves that can rotate about axles of rotation arranged perpendicular to the transport belt plane are attached to the holder strip, wherein these are guided in guide grooves of guide rails, with a positive lock.

In the case of all of the aforementioned belt band conveyors, the guide strips are stretched at the deflection in the region of the deflection rollers. Therefore, a material that permits constant expansions at the deflection must be selected. This in turn has the result that a soft, i.e. flexible material must be selected. The stresses that occur have the result that the lifetime of the guide strips is short. In the case of high speeds and small deflections, such guide strips, known from the state of the art, fail after a correspondingly short period of use.

Alternative solutions relate to curved belt conveyors in which guide rollers that circulate with the belt are attached, which are guided in locally fixed guides. Such a curved belt conveyor has become known from EP 0 980 462 B1. This discloses several co-circulating rollers on the endless transport belt of this conveyor, to guide it and to compensate for radial forces that are directed towards the inside of the curve. In this case, the axles of rotation of these rollers are attached to the transport belt via attachment means that project through openings in the transport belt. As the transport belt circulates, the running surfaces of the co-circulating rollers run along either only vertical or vertical and horizontal stationary guide surfaces of a support frame.

Similar curved belt conveyors have become known from U.S. Pat. No. 5,332,082 and NL-A-8702617.

With these solution variants, however, permanent excess stress in the region of the roller attachment to the belt can occur, in connection with the risk of canting and/or tearing in this region, so that these alternatives also cannot guarantee long life. However, a long life of the belt is particularly important, particularly in the case of belt curves, because as a rule, the belt is the most expensive element, and the replacement part is accordingly expensive. Another disadvantage in the case of these solution alternatives is the development of great noise at high circulation speeds.

A slat conveyor belt, i.e. a slat conveyor, has become known from German reference DE 103 22 216 A1 and from German Patent DE 23 23 601 C2 which relates to a corresponding U.S. Patent, the disclosure of which is hereby incorporated herein by reference. This disclosure of the slat conveyor belt comprises two belts or bands that circulate at a distance from one another, to which slats are attached, arranged in each instance crosswise to the transport direction. Guide element having guide surfaces extending in the transport direction of the transport belt, on which running surfaces inclined relative to the belt plane would roll off from rotating guide rollers as the transport belt circulates, so that crosswise forces that act on the transport belt, crosswise to its transport direction, can be or are compensated, are not provided there.

SUMMARY

The invention relates to a device for a belt band conveyor which allows for even small deflections and/or high circulating speeds. This result can occur wherein there can be a device with reliable guidance of the transport belt on the guide element for the guide rollers that projects beyond the belt plane, over a long period of time, free of problems, and that wherein there are advantageous possibilities for any repair that might be necessary, in cost-advantageous manner.

Thus, the invention relates to a curved belt conveyor comprising a transport belt, and a plurality of deflection rollers wherein the transport belt is guided over the deflection rollers. There is at least one guide shoe, which can be attached to the transport belt and at least one guide element coupled to the guide shoe, that projects beyond a belt plane. There can also be at least one rotating guide roller which interacts with the guide shoe to compensate for lateral forces that occur crosswise to a transport direction of the transport belt.

One embodiment may include a plurality of separate guide shoes that are attached to the transport belt, forming a guide strip for the guide rollers that extend in the transport direction, which circulates, and is divided into multiple parts.

These guide shoes can be arranged consecutive to one another in the transport direction, preferably forming a multiply interrupted or segmented guide strip, wherein these individual segment parts are attached to the transport belt. With this design, the guide shoes, for example segment parts can be arranged lying next to one another, and/or at a slight distance from one another, with the exception of deflection regions, in which deflection takes place crosswise to the belt plane.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views:

FIG. 6 shows a guide shoe according to a second embodiment in a cross-section perpendicular to the transport direction;

FIG. 7 shows a top view of the guide shoe according to FIG. 6;

FIG. 8 shows a guide shoe according to a third embodiment in a cross-section perpendicular to the transport direction;

FIG. 9 shows a guide shoe according to a fourth embodiment in a cross-section perpendicular to the transport direction;

FIG. 10 shows the guide shoe according to FIG. 9, attached to the transport belt, after welding;

FIG. 11 shows a longitudinal cross-section through a guide shoe according to a fifth embodiment;

FIG. 12 shows the guide shoe shown in FIG. 11, attached to a transport belt, after its attachment body has been pivoted relative to the actual guide shoe;

FIG. 13 shows the guide shoe according to the first embodiment, which is attached to a transport belt, by way of a separate attachment body;

FIG. 14 shows a cross-section parallel to the transport direction, along the section line 14—14 in FIG. 13;

FIG. 15 shows a partial view, in the form of a partial longitudinal cross-section of an alternative embodiment, in the region of a deflection roller, with a guide shoe, by way of a transport belt that lies between them;

DETAILED DESCRIPTION

Figure 1:
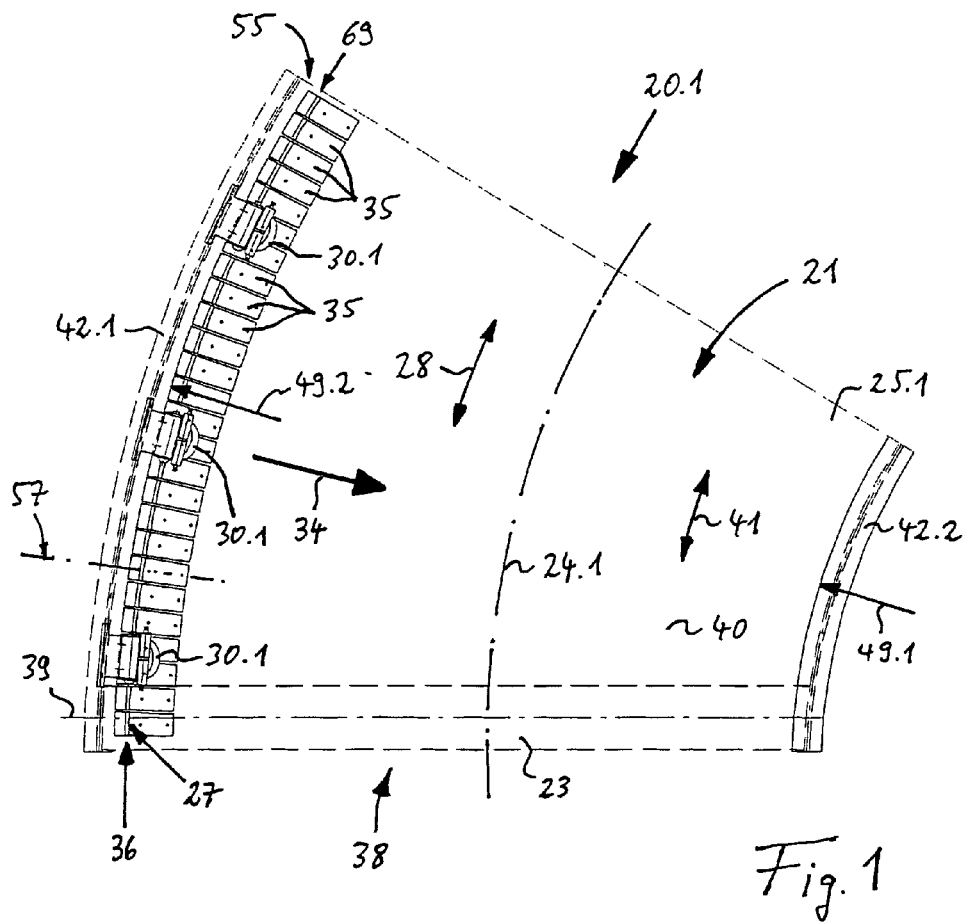
FIG. 1 shows a top view of a belt band conveyor, which is configured as a curved belt conveyor.

Referring to the drawings, FIG. 1 shows a belt band conveyor 20.1 configured as a curved belt conveyor 21. This curved belt conveyor has a transport segment 41 of a belt curve 38 that extends over a circular ring sector 40, which is formed by a closed, endless, band-shaped transport belt 25.1. Belt 25.1 can be guided by way of deflection rollers 23 that are rotatable around a rotation axis 39 and arranged at both ends of a circular ring sector 40, in each instance. Belt 25.1 is also guided by running rollers 30.1 that are arranged at uniform angular distances between them, which are not shown in FIG. 1. The axes of the running rollers intersect in a center of the circular ring sector 40, in a center point.

Running rollers 30.1 can be rollers that rise conically from an inside radius 49.1 of belt curve 38 to an outside radius 49.2 of belt curve 38, or cylindrical rollers. Deflection rollers 23 and/or the running rollers 30.1 can be formed, in each instance, from roller segments that are mounted on side plates 42.1, 42.2 of curved belt conveyor 21, axially adjacent to, and independent of one another, preferably mounted to rotate freely.

Figure 2:
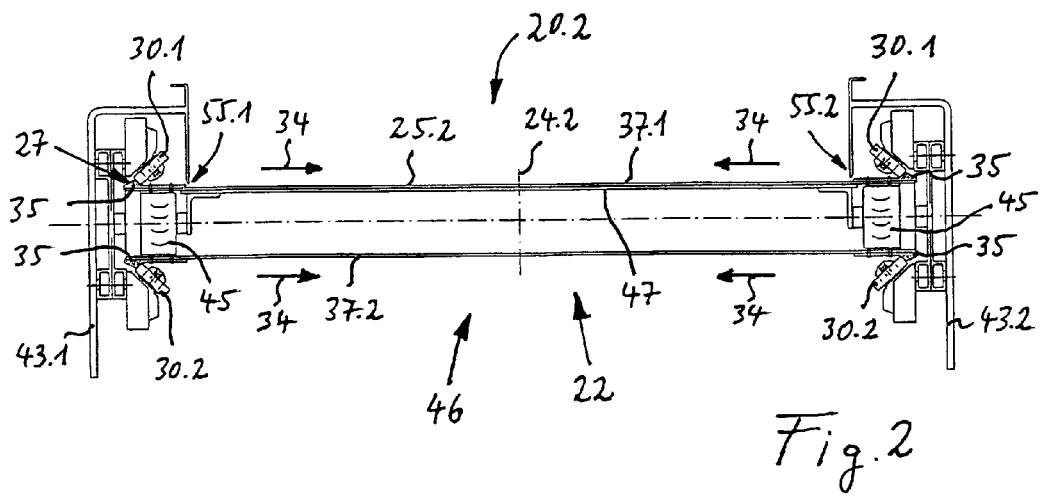
FIG. 2 shows a cross-sectional view of an alternative embodiment of a belt band conveyor, which is configured as a straight belt conveyor.
Figure 3:
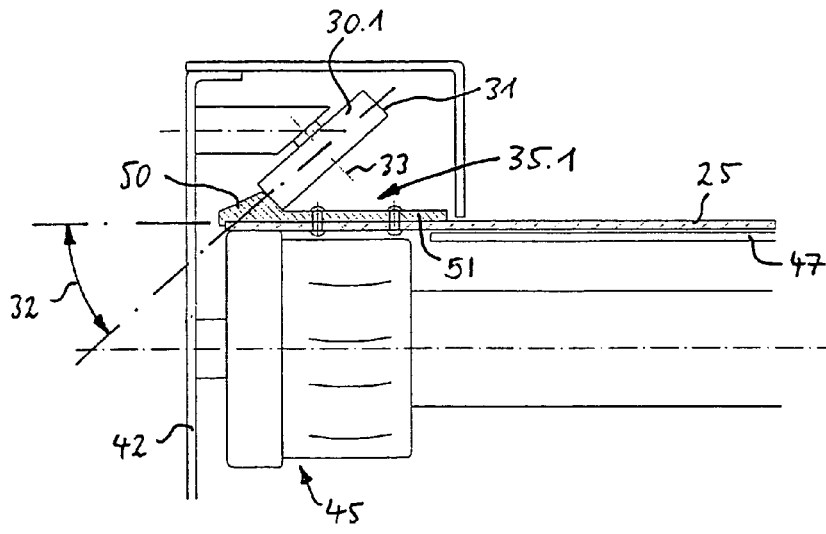
FIG. 3 shows an enlarged detail in the region of an outside edge of a transport belt, in a cross-section perpendicular to the transport direction.
Figure 4:
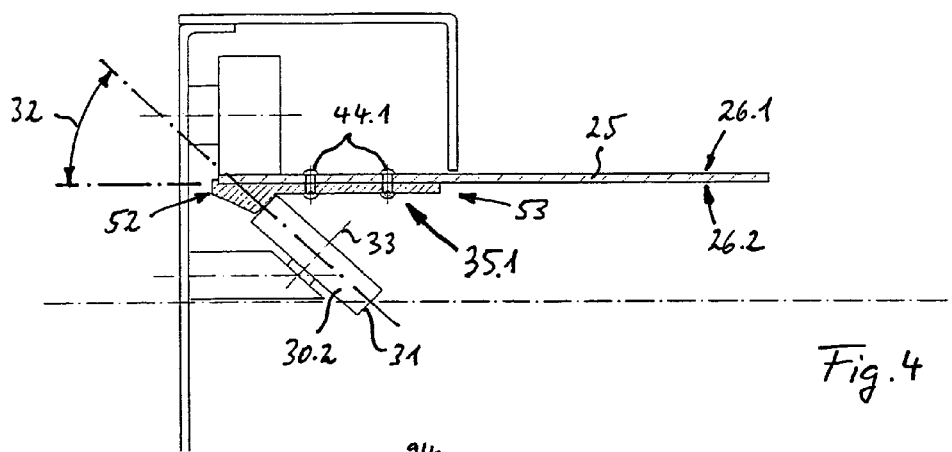
FIG. 4 shows a cross-sectional view of an enlarged detail in the region of an outside edge of a transport belt, wherein this view extends perpendicular to the transport direction.

FIG. 2 illustrates a belt band conveyor 20.2 that is configured as a straight belt conveyor 22. Belt band conveyor also comprises a closed, endless, band-shaped transport belt 25.2. Transport belt 25.2 is also guided by way of deflection rollers that are arranged at two ends, in each instance, as well as by way of running rollers 45 that are arranged spaced apart between them, wherein deflection rollers 23 are not shown in FIG. 2. Running rollers 45 can be cylindrical or preferably spherical rollers. Deflection rollers 23 and running rollers 45 are mounted on side plates 43.1, 43.2, and can rotate about roller axles that are configured parallel to belt plane 26.1, 26.2.

Both in the case of belt conveyor 21 according to FIG. 1 and in the case of straight belt conveyor 22 according to FIG. 2, support plates 47 can be arranged between upper belt segment 37.1 and lower belt segment 37.2, as well as between deflection rollers 23. For example, support plates 47 can be arranged between deflection rollers 23 and running rollers 45, parallel to a lower belt plane 26.2, which prevent an upper belt segment 37.1 from sagging under severe stress.

This invention can be implemented not only for belt curves 38 and straight belts 46, but also for belt S-designs that bridge different levels.

The drive of transport belts 25.1 and 25.2, which, for the sake of simplicity, are designated with reference symbol 25 hereinafter, can occur by means of a drive unit arranged below the lower belt segment 37.2. The drive can be by means of a motor-driven friction wheel, which can interact with lower belt segment 37.2 of transport belts 25. The drive of transport belts 25 can, however, also take place directly, via the running rollers 45, or by way of deflection rollers 23.1, 23.2, by friction. Finally, the drive of the transport belts 25 can also occur with a positive lock, via catch elements 73 on the drive side, which interact with catch elements 74 on the power take-off side, which in turn are attached to transport belt 25 (see FIGS. 14 and 15).

With curved belt conveyor 21, a plurality of separate guide shoes 35; 35.1 35.8 is attached in the region of the lateral outer edge region 55 of belt curve 38 with a straight belt conveyor 22. These guide shoes 35 are preferably attached in the region of the two lateral outer edge regions 55.1, 55.2 of transport belt 25.2, in each instance, which project beyond belt planes 26.1, 26.2 in the direction of the sides facing away from the deflection rollers 23. Guide shoes 35 can run along with the transport belts 25 as they circulate. Each guide shoe 35; 35.1 to 35.8 comprises an attachment part 51, for attaching guide shoe 35; 35.1 to 35.8 to transport belt 25, and preferably an edge bead 50 that projects beyond belt plane 26.1 or 26.2, towards the side facing away from the deflection rollers 23; 23.1, 23.2. Edge bead 50 follows attachment part 51 towards the outer edge. Edge bead 50 has guide surfaces 29 that are inclined towards a belt center 24.1, 24.2, for support, or guide rollers 30; 30.1, 30.2 that can rotate about rotation axles 33. Rollers 30. 30.1 and 30.2 engage with bead 50, on a side of edge bead 50 facing towards belt center 24.1; 24.2, with their running surfaces 31 that are inclined towards the belt plane 26.1, 26.2, by an angle 32 and roll off there, as guide belt 25 circulates. With this design, guide rollers 30; 30.1, 30.2 can be assigned to upper belt segment 37.1 and/or to lower belt segment 37.2.

Guide surfaces 29 of guide shoes 35 extend in transport direction 28 of transport belt 25, forming a guide strip 36 for guide rollers 30, which circulates and is divided into multiple parts. It is understood that instead of edge bead 50 or, if applicable, in addition to it, at least one beveled or rounded free end of guide shoe 35 could also serve as the guide surface for guide rollers 30.

As transport belts 25 circulate, longitudinal and transverse forces 34 can occur. In the case of curved belt conveyors 21, forces 34 that are directed radially inwards occur in operation. These forces can be absorbed or compensated by guide points 30 that engage on guide shoes 35. Consequently, the invention relates to a belt band conveyor 20.1, 20.2, particularly a curved belt conveyor 21, having an endless transport belt 25 that is guided by way of deflection rollers 23; 23.1, 23.2, to which a guide element 27 that projects beyond the belt plane 26.1, 26.2 is attached. Guide element 27 can be separately handled before being attached, and wherein guide element 27 runs along with the transport belt 25 as it circulates. Running surfaces 31, of guide rollers 30 are inclined relative to the belt plane 26.1, 26.2, to make contact on guide surfaces 29, which are preferably essentially flat and extend in a transport direction 28 of transport belt 25, as the transport belt 25 circulates. This design is so that crosswise forces 34 that occur crosswise to transport direction 28 of transport belt 25 can be compensated, whereby individual or separate guide shoes 35; 35.1 to 35.8 are attached to transport belt 25, forming a guide strip 36 for guide rollers 30 that extends in transport direction 28, circulates, and is divided into multiple parts, segmented, or interrupted multiple times.

Figure 5:
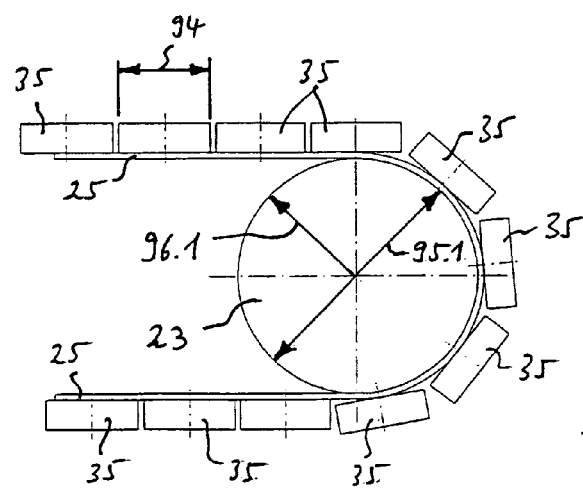
FIG. 5 shows a partial longitudinal cross-section in the transport direction, in the region of a deflection roller, according to a first roller configuration.

With this design, at least one guide shoe 35; 35.1 to 35.8 can be attached to transport belt 25 with an attachment means, so that it is lifted off or separated from transport belt 25 at least in partial regions. This occurs preferably in lateral outside edge regions, in the transport direction, during the deflection of transport belt 25 about deflection rollers 23; 23.1, 23.2, as shown in FIG. 5.

Furthermore, as shown in FIG. 8, there can be at least one point-shaped attachment point 56 that is formed between at least one guide shoe 35; 35.1 to 35.5 and said transport belt 25, wherein a line-shaped, preferably straight attachment point 57, which runs crosswise, preferably perpendicular to the transport direction, and is formed between at least one guide shoe 35; 35.1 to 35.8 and transport belt 25.

With this design, it can be practical if at least one guide shoe 35.1, 35.3, 35.8 is attached to guide belt 25 via rivets or screws 44.1, 44.1 which can function as an attachment means. In this case, at least one guide shoe 35; 35.1 to 35.8 can be attached in a region of a side edge or lateral outside edge region 55; 55.1, 55.2, in other words preferably at the outside edge of transport belt 25.

Alternatively, as shown in FIGS. 9 and 10, at least one guide shoe can also be attached to transport belt 25 so that it is configured with at least one attachment aid body 58 that extends crosswise to belt plane 26.1, 26.2. This body comprises a weldable material and which is attached to transport belt 25, after having been passed through a passage opening 59.1 in belt 25 by welding, preferably of the outward extending tips of the attachment aid body 58 in forming attachment heads 89 (FIG. 10).

FIG. 13 shows that guide shoe 35; 35.1 to 35.5 can also have a projection 60 that engages behind the outer edge, or side edge 55 of transport belt 25. Such a projection can be a contact projection that can serve to assist assembly and can provide additional support for crosswise forces that act on guide shoe 35; 35.1 to 35.5 at side edge 55 of transport belt 25. Examples of such guide shoes are also shown in FIGS. 3, 4, and 6 to 10.

FIGS. 12–16 and 18 show at least one guide shoe 35.1, 35.5, 35.6 that can be arranged on a first side 61 of transport belt 25 and attached to transport belt 25 via an attachment body 65.1 to 65.4 that is arranged on second side 62 of transport belt 25 that faces away from first side 61 of transport belt 25. This body is preferably narrow in the transport direction and extends crosswise to transport direction 28. In this way, forces that act on guide shoes 35; 35.1 to 35.8 by way of transport belt 25 can be better absorbed and distributed more uniformly to minimize the risk of transport belt 25 tearing or of the guide shoes being pulled out.

In another alternative embodiment, attachment body 65.1 to 65.4, in each instance, can be configured with at least one attachment aid body 58 that extends crosswise to belt plane 26.1, 26.2, wherein this body consists of a weldable material and is attached to the guide shoe via welding, after having been inserted through passage openings or holes 59.1, 59.2 in the transport belt that are formed crosswise to belt plane 26.1, 26.2 and, if applicable, passage openings or holes 48 in the guide shoe.

Figure 16:
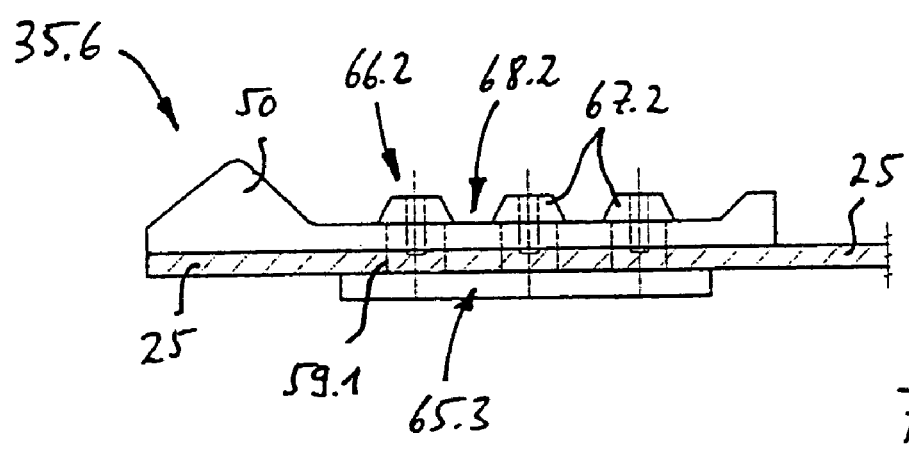
FIG. 16 shows a sixth embodiment of a guide shoe according in a longitudinal cross-section perpendicular to the transport direction.

Using the example of the embodiment shown in FIGS. 11, 12, and 16, guide shoe 35.5 and/or the attachment body 65.3 can be attached to transport belt 25 using at least one catch element 66.1, 66.2. This catch element can be inserted into or through a passage opening 59.1 in transport belt 25, formed crosswise to belt plane 26.1, 26.2. With this design, catch element 66.1, 66.2 can advantageously comprise a male insertion element 67.1, 67.2, which can be locked into a related female accommodation element 68.1, 68.2, so that in the assembled state, insertion element 67.1, 67.2 is locked onto or into accommodation element 68.1, 68.2, forming a rigid connection with transport belt 25 that lies between them. In this connection, guide shoe 35.5 can surround insertion element 67.1, and wherein attachment body 65.1 surrounds the accommodation element 68.1, as this is shown in FIG. 12. Alternatively, or additionally, FIG. 16 shows that attachment body 65.3 can surround insertion element 67.2 and that guide shoe 35.6 can surround accommodation element 68.2.

Just like guide shoe 35, attachment body 65.1, 65.2, and 65.4 can also have a projection 63 that engages behind side edge 55, or only the body can have this feature. Projection 63 can also serve as a contact projection during assembly, and can additionally absorb and support the crosswise forces that occur.

FIGS. 11 and 12 show at least one guide shoe 35.5 that is connected with attachment body 65.1, in each instance, by way of an edge part 70 that engages around side edge 55 of transport belt 25. This results in particular production and assembly advantages. With this design, edge part 70 can be connected in one piece with guide shoe 35.5 and with attachment body 65.1. Edge part 70 can be configured as a hinge 71, about which guide shoe 35.5 and/or attachment body 65.1 is pivoted, for attaching to transport belt 25, as shown in FIG. 11, using arrow 72. Finally, as shown in FIG. 12, hinge 71 can be arranged in the region of the side edge 55 of transport belt 25, after attachment of the guide shoe 35.5 to transport belt 25.

However, use of the attachment bodies does not have to be restricted to allowing or improving an attachment of guide shoes 35, but instead, the attachment body can also perform other functions. Accordingly, attachment body 65.2 can be configured with an engagement element 73 on the power take-off side, which is intended to be brought into interaction with an engagement element 74 on the drive side, to create a movement of transport belt 25 in transport direction 28. FIGS. 13 to 15 show an example for such an embodiment. With this design, as shown in FIG. 15, attachment body 65.2 can be configured with the belt-side tooth 75.1, which can be brought into engagement with teeth 75.2 of a gear crown 76 on the drive side, to create a drive of transport belt 25.

Figure 19:
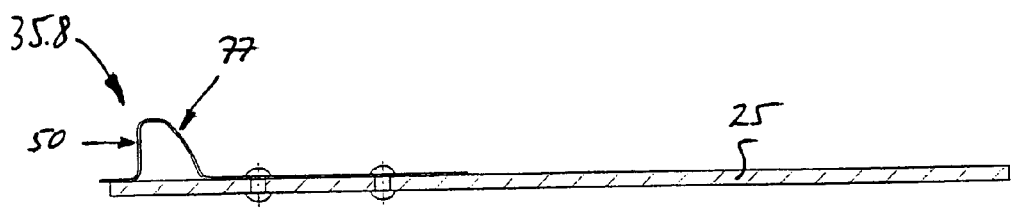
FIG. 19 shows an eighth embodiment of a guide shoe in the form of a cross-sectional view perpendicular to the transport direction.

At least one guide shoe 35 can be comprised of a hard and preferably impact-resistant material, preferably made of solid material and particularly of plastic or metal. FIG. 19 shows an alternative for a guide shoe comprising a solid material. There, guide shoe 35.8 can be configured as a sheet metal body 77, which can be produced for example via punching or bending. Accordingly, guide shoe 35.8 can be configured as a sheet metal body 77.

FIGS. 6 and 7 show another embodiment variant, wherein at least one guide shoe 35.2 can comprise a support 78 made of a hard and preferably impact-resistant material attached to transport belt 25, and a guide body 84, 79 attached to it, wherein there are guide rollers 30 made of a comparatively softer material. With this design, guide body 79 is applied to the support, for example, bandaged or inserted or injection-molded into support 78. Of course, guide surfaces 29 of guide rollers 30 can also be formed with a soft material that creates a low roll-off noise even at high rolling speeds, or can be formed only with such a material. Thus, for example, guide rollers 30 can be bandaged or repaired with such a material.

Guide shoes 35, 35.1 to 35.8 that are immediately adjacent in transport direction 28 can be attached to transport belt 25 so that they preferably rest against one another, preferably laterally, at least part of the time as the belt moves, at least in partial regions. This design results in a better transfer of force and a reduced noise level. With this design, guide shoes 35, 35.1 to 35.8 that are immediately adjacent in transport direction 28 are attached to transport belt 25 so that they preferably rest against one another, laterally, at least part of the time as the belt moves, at least in the region of their ends 52 that extend outward away from belt center 24.

Figure 17:
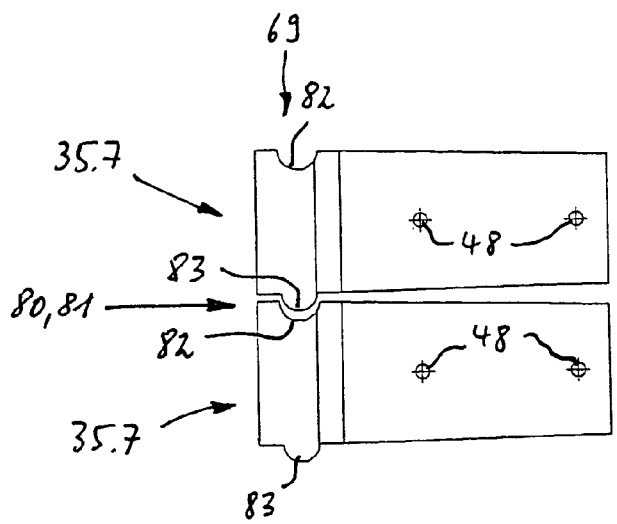
FIG. 17 shows a top view of a seventh embodiment, which shows two guide shoes which have a groove arranged in the region of the edge beads and a feather key.

A beneficial transfer of force and connection can be achieved wherein guide shoes 35.7 that are immediately adjacent in the transport direction are connected with one another, forming a positive lock connection 80. In a concrete embodiment, this can be achieved if guide shoes 35.7 that are immediately adjacent in the transport direction are connected with one another via a tongue/groove connection 81, as shown in FIG. 17. For this purpose, guide shoes 35.7 can be configured with a groove 82 on their one longitudinal side and with a feather key 83 on their other longitudinal side, which faces away from the former, in their outside edge region 69, in the region of edge beads 50. With this design, feather key 83 and groove 82 of guide shoes 35.7, in each instance, are configured to coordinate with one another. This is so that the desired groove/key connection comes about when feather key 83 of a first guide shoe 35.7 engages into an adjacent groove 82 of a second guide shoe 35.7 immediately adjacent to it, when guide shoes 35.7 lie close to one another.

With the point-shaped or line-shaped attachment of the guide shoes already described above, the aforementioned groove/key connection 81 can open at deflections crosswise to the belt plane 26.1, 26.2. This connection can be closed in deflection regions in belt plane 26.1, 26.2, for example, in level deflection regions or in level, straight transport regions, to achieve reciprocal support of guides shoes 35.7, in each instance, among one another. Consequently, such a connection can contribute to assuring smooth transitions despite specific tolerances from one guide shoe to another. Accordingly, the positive lock connection 80 can be configured so that it is out of engagement in the region of a deflection of transport belt 25, particularly in the region of deflection rollers 23, at which transport belt 25 is deflected crosswise to its belt plane 26.1, 26.2.

Figure 18:
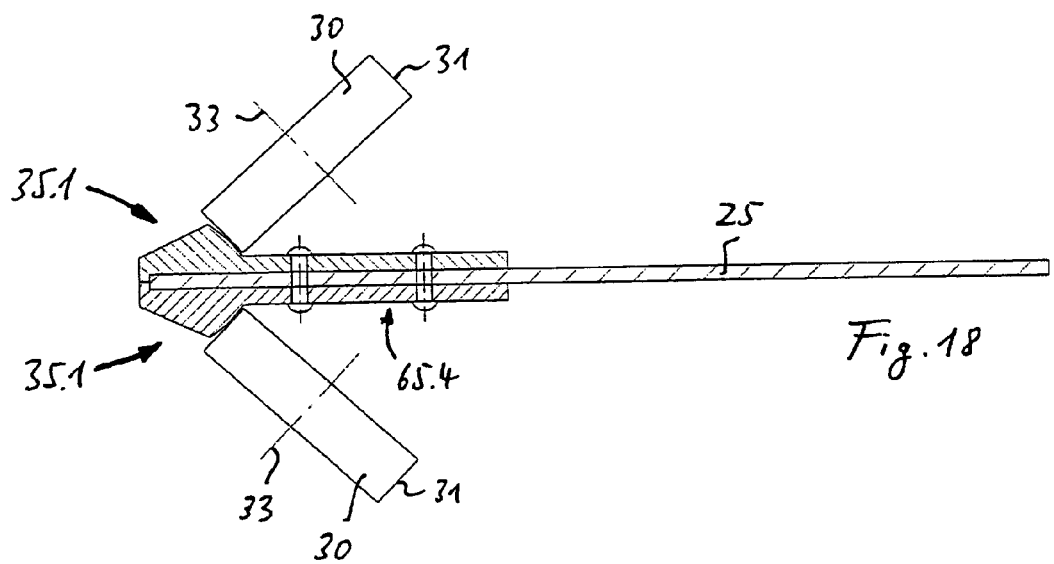
FIG. 18 shows a cross-sectional view extending perpendicular to the transport direction of an arrangement of two guide shoes, which are configured according to the first embodiment.

FIG. 18 shows two guide shoes 35 that can also be attached to transport belt 25 on opposite sides, with the belt lying between them. In this way, even higher crosswise forces can be compensated in specific applications.

With straight belt conveyors, in particular, the guide shoes have an essentially rectangular outside contour in a projection plane perpendicular to the belt plane 26.1, 26.2. FIGS. 7 and 17 show guide shoes 35 that have an outside contour that is configured in the shape of a trapezoid 86, in a projection plane perpendicular to belt plane 26.1, 26.2. Preferably, the guide shoes have an outside contour 85 that is configured as an equilateral trapezoid 86 in a projection plane perpendicular to belt plane 26. With this design, guide shoes 35; 35.2, 35.7 can be configured with outer face surfaces 87.1, 87.2 that are preferably essentially straight and face away from one another in the transport direction 28. This design forms sides 88.1, 88.2 of an angle whose peak can be arranged at a distance from a greater base edge 91 of trapezoid 86, in the direction of a smaller base edge 92 of the trapezoid 86 or in the direction of belt center 24 or in the direction of a center point of transport belt 25 configured as a belt curve 38, or can coincide with the center point of transport belt 25 configured as a belt curve 38.

Guide shoes 35 can have an average width 94, in transport direction 28, that is less than the effective deflection diameter 95.1, 95.2 of the deflection rollers 23.1, 23.2.

Finally, the average width 94 of guide shoes 35 is equal to or less than the effective deflection radius 96.1, 96.2 of the deflection rollers 23.1, 23.2.

To prevent smaller parts, for example, pieces of paper or letters, from getting under the side guide and the transport belt 25 during transport, at least one guide shoe 35 can have a sealing shank 97.1, 97.2 in the region of its end 53 that faces away from its guide surfaces 29 and faces in the direction of belt center 24. FIG. 8 shows the sealing shank which vertically overlaps a cover shank or cover plate 98 that is arranged fixed in place and extends crosswise to belt plane 26.1, 26.2, in the direction towards transport belt 25. With this design, a kind of labyrinth seal can therefore be formed towards belt center 24, so that guide shoes 35 accordingly can also have other functionalities. The shape of the labyrinth can be adapted in accordance with the requirements.

FIGS. 6, 8–13, 18 and 19 show advantageous guide and support conditions, also under changing loads and stresses, wherein at least one guide shoe 35 has guide surfaces 29 for guide rollers 30, which have a convex curvature 99 in a section plane that runs perpendicular to belt plane 26.1, 26.2 and perpendicular to the transport direction 28.

At least one guide shoe can have guide surfaces that have a concave curvature in a section plane that runs parallel to belt plane 26.1, 26.2. In this case, the guide surfaces are rounded with a radius that approximately corresponds to the running radius of guide rollers 30. Such a configuration can be used for small belt curves, for example, in the case of belt curves having a small radius or also standardized belt curves having a uniform radius for large item numbers.

Accordingly, while a few embodiments of the present invention have been shown and described, it is to be understood that many changes and modifications may be made thereunto without departing from the spirit and scope of the invention as defined in the appended claims.

What is claimed is:

1. A belt conveyor comprising:
a) a transport belt having at least one hole;
b) a plurality of deflection rollers wherein said transport belt is guided over said plurality of deflection rollers;
c) at least one guide shoe, which can be attached to said transport belt;
d) at least one guide element coupled to said at least one guide shoe, that projects beyond a belt plane of said transport belt; and
e) at least one rotating guide roller which interacts with said at least one guide shoe to compensate for lateral forces that occur crosswise to a transport direction of said transport belt;
f) at least one attachment aid body coupled to said at least one guide shoe and extending crosswise to said transport belt plane wherein each of said at least one guide shoe includes a weldable material that is attached to said transport belt after having been passed through said at least one hole.

2. The belt conveyor as in claim 1, further comprising an attachment means, wherein said at least one guide shoe is attached to said transport belt with said attachment means, wherein said at least one guide shoe is lifted off of said transport belt at least in partial regions, wherein said transport belt is deflected about said plurality of deflection rollers.

3. The belt conveyor as in claim 1, further comprising at least one point-shaped attachment point which is formed between each of said at least one guide shoe and said transport belt.

4. The belt conveyor as in claim 3, further comprising at least one line-shaped attachment point which runs crosswise to said transport direction and which is formed between each of said at least one guide shoe and said transport belt.

5. The belt conveyor as in claim 1, further comprising at least one rivet, wherein said at least one guide shoe is attached to said transport belt via said at least one rivet.

6. The belt conveyor as in claim 1, wherein said transport belt has a side edge and wherein said at least one guide shoe is attached in a region of said side edge of said transport belt.

7. The belt conveyor as in claim 1, further comprising at least one screw, wherein said at least one guide shoe is attached to said transport belt via said at least one screw.

8. The belt conveyor as in claim 1, wherein said at least one guide shoe has a projection that engages behind a side edge of said transport belt.

9. A belt conveyor comprising:
a) a transport belt;
b) a plurality of deflection rollers wherein said transport belt is guided over said plurality of deflection rollers;
c) at least one guide shoe, which can be attached to said transport belt;
d) at least one guide element coupled to said at least one guide shoe, that projects beyond a belt plane of said transport belt; and
e) at least one rotating guide roller which interacts with said at least one guide shoe to compensate for lateral forces that occur crosswise to a transport direction of said transport belt wherein said transport belt further comprises at least one hole,
wherein said at least one guide shoe is arranged on a first side of said transport belt and wherein said at least one guide shoe further comprises at least one attachment body that is disposed on a second side of said transport belt that faces away from said first side of said transport belt,
wherein said at least one attachment body is configured with at least one attachment aid body that extends crosswise to said belt plane, wherein said attachment aid body is comprised of a weldable material and which, after passing through a plurality of holes in said transport belt said attachment aid body is formed crosswise to said belt plane and said guide shoe, wherein said attachment aid body is attached to said transport belt by means of welding.

10. A belt conveyor comprising:
a) a transport belt;
b) a plurality of deflection rollers wherein said transport belt as guided over said plurality of deflection rollers;
c) at least one guide shoe, which can be attached to said transport belt;
d) at least one guide element coupled to said at least one guide shoe, that projects beyond a belt plane of said transport belt; and e) at least one rotating guide roller which interacts with said at least one guide shoe to compensate for lateral forces that occur crosswise to a transport direction of said transport belt, wherein said at least one guide shoe is arranged on a first side of said transport belt and wherein said at least one guide shoe further comprises at least one attachment body that is disposed on a second side of said transport belt that faces away from said first side of said transport belt, f) at least one catch element wherein said at least one guide shoe and said at least one attachment body are attached to said transport belt using said at least one catch element that can be inserted into, or through a hole in said transport belt, and extend crosswise to said belt plane, wherein said at least one catch element comprises a male insertion element and a female accommodation element, wherein said male insertion element can be locked into said female accommodation element, so that in an assembled state, said male insertion element is locked onto or into said female accommodation element forming a rigid connection with said transport belt which lies between said male insertion element and said female accommodation element.

11. The belt conveyor as in claim 10, further comprising a guide shoe that surrounds said male insertion element, and wherein said at least one attachment body surrounds said female accommodation element.

12. The belt conveyor as in claim 10, wherein said at least one attachment body surrounds said male insertion element and said at least one attachment body surrounds said female accommodation element.

13. The belt conveyor as in claim 9, wherein said at least one attachment body has a projection that engages behind a side edge of said transport belt.

14. The belt conveyor as in claim 9, wherein said at least one guide shoe further comprises an edge part, that is coupled to said at least one attachment body, and that engages around a side edge of said transport belt.

15. The belt conveyor as in claim 14, wherein said edge part is coupled in one piece with said at least one guide shoe and said at least one attachment body.

16. The belt conveyor as in claim 14, wherein said edge part is configured as a hinge, about which said at least one guide shoe and said at least one attachment body are pivoted, for allowing an attachment to said transport belt.

17. The belt conveyor as in claim 16, wherein said hinge is arranged in a region of said side edge of said transport belt after said attachment of said at least one guide shoe to said transport belt.

18. The belt conveyor as in claim 9, wherein said at least one attachment body has a first engagement element disposed on a power take off side, wherein said first engagement element is brought into interaction with a second engagement element disposed on a drive side to create a movement of said transport belt in said transport direction.

19. A belt conveyor comprising:
a) a transport belt;
b) a plurality of deflection rollers wherein said transport belt is guided over said plurality of deflection rollers;
c) at least one guide shoe, which can be attached to said transport belt;
d) at least one guide element coupled to said at least one guide shoe, that projects beyond a belt plane of said transport belt; and
e) at least one rotating guide roller which interacts with said at least one guide shoe to compensate for lateral forces that occur crosswise to a transport direction of said transport belt;
f) at least one attachment body, coupled to said at least one guide shoe, and
g) least one gear crown, having a plurality of teeth wherein said at least one attachment body is configured to interact with said plurality of teeth on said at least one gear crown.

20. The belt conveyor as in claim 19, wherein said at least one guide shoe is comprised of a hard, substantially impact-resistant material.

21. The belt conveyor as in claim 20, wherein said at least one guide shoe is comprised of a solid material, such as plastic or metal.

22. A belt conveyor comprising:
a) a transport belt;
b) a plurality of deflection rollers wherein said transport belt is guided over said plurality of deflection rollers;
c) at least one guide shoe, which can be attached to said transport belt;
d) at least one guide element coupled to said at least one guide shoe, that projects beyond a belt plane of said transport belt; and
e) at least one rotating guide roller which interacts with said at least one guide shoe to compensate for lateral forces that occur crosswise to a transport direction of said transport belt wherein said at least one guide shoe is configured as a sheet metal body.

23. A belt conveyor comprising:
a) a transport belt;
b) a plurality of deflection rollers wherein said transport belt is guided over said plurality of deflection rollers;
c) at least one guide shoe, which can be attached to said transport belt;
d) at least one guide element coupled to said at least one guide shoe, that projects beyond a belt plane of said transport belt; and
e) at least one rotating guide roller which interacts with said at least one guide shoe to compensate for lateral forces that occur crosswise to a transport direction of said transport belt, wherein said at least one guide shoe comprises at least one support made from a substantially hard, impact resistant material that is coupled to said transport belt, and further comprises at least one guide body that is attached to said support and made from a comparatively softer material.

24. The belt conveyor as in claim 23, wherein said at least one guide body is bandaged, inserted, or injection molded into at least one support.

25. A belt conveyor comprising:
a) a transport belt;
b) a plurality of deflection rollers wherein said transport belt is guided over said plurality of deflection rollers;
c) at least one guide shoe, which can be attached to said transport belt;
d) at least one guide element coupled to said at least one guide shoe, that projects beyond a belt plane of said transport belt; and
e) at least one rotating guide roller which interacts with said at least one guide shoe to compensate for lateral forces that occur crosswise to a transport direction of said transport belt wherein said at least one guide shoe comprises a plurality of guide shoes that are disposed immediately adjacent to each other, extending in said transport direction, and attached to said transport belt so that said plurality of guide shoes rest against one another laterally, in at least partial regions.

26. The belt conveyor as in claim 25, wherein said plurality of guide shoes that are disposed immediately adjacent to each other in said transport direction are attached to said transport belt so that they rest against one another, laterally, at least in a region of their ends that extend outward from said center region of said transport belt.

27. The belt band conveyor as in claim 25, wherein said plurality of guide shoes are positioned immediately adjacent to each other in said transport direction and are connected with each other to form a positive lock connection.

28. The belt conveyor as in claim 27, wherein said plurality of guide shoes that are disposed immediately adjacent to each other in said transport direction are connected to each other via a tongue and groove connection.

29. The belt conveyor as in claim 28, wherein at least two guide shoes of said plurality of guides shoes are coupled to said transport belt on opposite sides from each other with said transport belt being disposed between said at least two guide shoes.

30. The belt conveyor as in claim 29, wherein, said plurality of guide shoes have a substantially rectangular outside contour, extending in a projection plane that is parallel to said belt plane.

31. The belt conveyor as in claim 25, wherein said plurality of guide shoes have an outside contour that is shaped as a trapezoid, in a projection plane that extends parallel to said belt plane.

32. The belt conveyor as in claim 31, wherein said plurality of guide shoes have an outside contour, that is configured as an equilateral trapezoid.

33. The belt conveyor as in claim 31, wherein said plurality of guide shoes have outer face surfaces that face away from each other in said transport direction, wherein said outer face surfaces form sides which angle in towards each other, towards a center or inner region of said transport belt.

34. The belt conveyor as in claim 33, wherein said plurality of guide shoes have an average width, that extends in said transport direction, that is less than an effective deflection diameter of said plurality of deflection rollers.

35. The belt conveyor as in claim 34, wherein said plurality of guide shoes have an average width that is equal to or less than an effective deflection radius of at least one of said plurality of deflection rollers.

36. The belt conveyor as in claim 25, wherein at least one of said plurality of guide shoes have a sealing shank that projects beyond said belt plane in a region of an end that faces away from a set of guide surfaces on said plurality of guide shoes, and in a direction of said center region of said transport belt, wherein the belt conveyor further comprises a cover shank that is arranged fixed in place and extends crosswise to said belt plane in a direction towards said transport belt.

* * * * *